United States Patent
McMorrow et al.

(10) Patent No.: US 10,742,288 B2
(45) Date of Patent: Aug. 11, 2020

(54) PHASED ARRAY WITH BEAMFORMING INTEGRATED CIRCUIT HAVING TWO SIGNAL CHAINS

(71) Applicant: Anokiwave, Inc., San Diego, CA (US)

(72) Inventors: Robert J. McMorrow, San Diego, CA (US); Vipul Jain, San Diego, CA (US); Wade C. Allen, San Diego, CA (US); David W. Corman, San Diego, CA (US); Robert Ian Gresham, San Diego, CA (US); Kristian N. Madsen, San Diego, CA (US); Nitin Jain, San Diego, CA (US)

(73) Assignee: ANOKIWAVE, INC., San Diego, CA (US)

( * ) Notice: Subject to any disclaimer, the term of this patent is extended or adjusted under 35 U.S.C. 154(b) by 0 days.

(21) Appl. No.: 16/221,057

(22) Filed: Dec. 14, 2018

(65) Prior Publication Data
US 2019/0132035 A1  May 2, 2019

Related U.S. Application Data

(63) Continuation-in-part of application No. 15/389,675, filed on Dec. 23, 2016, now Pat. No. 10,200,098.

(51) Int. Cl.
*H04L 5/14* (2006.01)
*H04B 7/06* (2006.01)
(Continued)

(52) U.S. Cl.
CPC ........... *H04B 7/0617* (2013.01); *H01Q 1/288* (2013.01); *H01Q 3/34* (2013.01); *H01Q 9/0407* (2013.01);
(Continued)

(58) Field of Classification Search
CPC . H04B 1/40; H04B 17/21; H04B 7/06; H04B 7/0617; H04B 7/0602; G01S 7/032;
(Continued)

(56) References Cited

U.S. PATENT DOCUMENTS 5,027,125 A * 6/1991 Tang ................. H01Q 3/24
342/368
5,339,086 A * 8/1994 DeLuca .................. H01Q 3/22
342/371
(Continued)

OTHER PUBLICATIONS

Natera et al, New Antenna Array Architecture for Satellite Communications, Advances in Satellite Communications, downloadable at www.intechopen.com, 30 pages, Jul. 2011.*
Trujillo et al, GEODA-GRUA: Adaptive Multibeam Conformal Antenna for Satellites Communications, IEEE, 4 pages, 2011.*
Campo et al, T/R module design for GEODA antenna, IEEE, 6 pages, Apr. 200.*

*Primary Examiner* — Frank Duong
(74) *Attorney, Agent, or Firm* — Nutter McClennen & Fish LLP (57) ABSTRACT

A beamforming integrated circuit has a single channel with a transmit chain and a receive chain. The transmit chain is configured to transmit an output signal and, in a corresponding manner, the receive chain is configured to receive an input signal. The integrated circuit also has separate horizontal and vertical polarity ports, and a double pole, double throw switch operably coupled between the chains and the ports. The double pole, double throw switch is configured to switch between operation in a first mode and a second mode.

3 Claims, 9 Drawing Sheets

(51) Int. Cl.
  *H01Q 3/34* (2006.01)
  *H01Q 1/28* (2006.01)
  *H01Q 9/04* (2006.01)
  *H01Q 21/06* (2006.01)
  *H04B 7/10* (2017.01)

(52) U.S. Cl.
  CPC ......... *H01Q 21/065* (2013.01); *H04B 7/0602* (2013.01); *H04B 7/10* (2013.01)

(58) Field of Classification Search
  CPC .. G01S 13/4463; H01Q 9/04; H01Q 21/0093; H01Q 21/0025; H01Q 25/02; H01Q 3/26; H04W 12/28; H04W 24/02; H04W 16/28; H01P 1/10; H01P 1/12; H01P 1/127
  See application file for complete search history.

(56) References Cited

U.S. PATENT DOCUMENTS

| | | | | |
|---|---|---|---|---|
| 8,817,672 B2* | 8/2014 | Corman | ................... | H01Q 3/26 |
| | | | | 370/278 |
| 9,124,361 B2* | 9/2015 | Puzella | ................... | G01S 7/032 |
| 10,224,629 B2* | 3/2019 | West | ................... | H01Q 3/2682 |
| 2011/0267998 A1* | 11/2011 | Meharry | ................... | H01Q 3/24 |
| | | | | 370/297 |
| 2013/0072125 A1* | 3/2013 | Yoon | ................... | H01P 1/10 |
| | | | | 455/67.11 |
| 2016/0100489 A1* | 4/2016 | Costa | ................... | H01F 27/24 |
| | | | | 361/764 |
| 2016/0336344 A1* | 11/2016 | Mason | ................... | H01L 29/78603 |

* cited by examiner

PHASED ARRAY WITH BEAMFORMING INTEGRATED CIRCUIT HAVING TWO SIGNAL CHAINS

PRIORITY

This patent application claims is a continuation-in-part of U.S. patent application Ser. No. 15/389,675 filed Dec. 23, 2016, entitled, "PHASED ARRAY WITH BEAMFORMING INTEGRATED CIRCUIT HAVING TWO SIGNAL CHAINS," and naming Robert McMorrow, Ian Gresham, Vipul Jain, Kristian Madsen, Wade Allen, Nitin Jain, and David Corman as inventors, the disclosure of which is incorporated herein, in its entirety, by reference.

RELATED APPLICATION

This patent is related to U.S. patent application No. 62/671,763, filed May 15, 2018, entitled, "CROSS-POLARIZED TIME DIVISION DUPLEXED ANTENNA," and naming Timothy Carey, Vipul Jain, Jason Durbin, Nitin Jain, and David Corman as inventors, the disclosure of which is incorporated herein, in its entirety, by reference.

FIELD OF THE INVENTION

Some embodiments of the invention generally relate to phased array systems and, more particularly, the some embodiments of the invention relate to beamforming integrated circuits used with phased array systems.

BACKGROUND OF THE INVENTION

Antennas that emit electronically steered beams are known in the art as "phased array antennas." Such antennas are used worldwide in a wide variety of commercial and radar applications. They typically are produced from many small radiating elements that are individually phase controlled to form a beam in the far field of the antenna.

Among other things, phased array antennas are popular due to their ability to rapidly steer beams without requiring moving parts. One problem, however, is their cost. They can cost on the order of $1000 per element. Thus, for a 1000 element array, the cost can reach or exceed $1,000,000.

SUMMARY OF VARIOUS EMBODIMENTS

In accordance with one embodiment of the invention, a beamforming integrated circuit has a single channel with a transmit chain and a receive chain. The transmit chain is configured to transmit an output signal and, in a corresponding manner, the receive chain is configured to receive an input signal. The integrated circuit also has separate horizontal and vertical polarity ports, and a double pole, double throw switch operably coupled between the chains and the ports. The double pole, double throw switch is configured to switch between operation in a first mode and a second mode.

Specifically, in the first mode, the double pole, double throw switch is configured to couple the transmit chain to one of the horizontal polarity port and the vertical polarity port. In a corresponding manner, in the second mode, the double pole, double throw switch is configured to couple the receive chain to the other of the horizontal polarity port and the vertical polarity port not coupled with the transmit chain in the first mode. More generally, when in the first mode, the switch connects the transmit chain to a first of the two ports. When in the second mode, however, the switch connects the receive chain to the second of the two ports. The transmit chain is electrically isolated from the receive chain in both the first and second modes.

The beamforming integrated circuit also may have a die substrate that implements at least a portion of the transmit chain and the receive chain. Among other things, the die substrate may include a silicon-on-insulator wafer having a device layer and a handle layer. Thus, the transmit chain and the receive chain on the die substrate are implemented on the device layer. The die substrate also may include at least one flip chip interface configured for flip chip bonding.

The transmit chain and receive chain each include a plurality of circuit blocks. To provide specific functionality in certain instances, the integrated circuit may be configured to activate and deactivate selected circuit blocks in each of the chains.

Among other things, the transmit chain may include a power amplifier and a transmit phase shifter, while the receive chain may include a low noise amplifier and a receive phase shifter. In addition, the receive chain further may include 1) a receive chain input selectively couplable with the double pole, double throw switch, 2) a digital step attenuator and 3) a buffer amplifier between the receive phase shifter and the digital step attenuator. Alternatively or in addition, the transmit chain may include 1) a transmit chain output selectively couplable with the double pole, double throw switch, 2) a digital step attenuator and 3) a buffer amplifier between the transmit phase shifter and the digital step attenuator.

In the first mode, the double pole, double throw switch may be configured to couple the transmit chain to of the horizontal polarity port, while in the second mode, the double pole, double throw switch may be configured to couple the receive chain to the vertical polarity port. Alternatively, in the first mode, the double pole, double throw switch may be configured to couple the transmit chain to of the vertical polarity port, while in the second mode, the double pole, double throw switch may be configured to couple the receive chain to the horizontal polarity port.

The double pole, double throw switch preferably is configured to prevent simultaneous signal receipt by the receive chain and signal transmission by the transmit chain. More generally, when one chain is connected to one of the two ports, the other chain may be unconnected to both ports.

In accordance with another embodiment of the invention, a phased array has a laminar substrate and a plurality of elements on the laminar substrate forming a patch phased array. Each of the elements includes both an element horizontal polarity port and an element vertical polarity port. The array also has a plurality of beamforming integrated circuits on the laminar substrate similar to that described above and below. To that end, each of the plurality of beamforming integrated circuits may include a transmit chain and a receive chain, an IC horizontal polarity port and an IC vertical polarity port, and a double pole, double throw switch operably coupled between the chains and the IC ports. In a manner similar to other embodiments, the double pole, double throw switch is configured to switch between operation in a first mode and a second mode.

Specifically, in the first mode, the double pole, double throw switch is configured to couple the transmit chain to one of the IC horizontal polarity port and the IC vertical polarity port, while in the second mode, the double pole, double throw switch is configured to couple the receive chain to the other of the IC horizontal polarity port and the IC vertical polarity port not coupled with the transmit chain in the first mode.

Each IC horizontal polarity port is electrically connected with one element horizontal polarity port. In a corresponding manner, each IC vertical polarity port is electrically connected with one element vertical polarity port.

In accordance with other embodiments of the invention, a beamforming integrated circuit includes a die substrate having a transmit chain and a receive chain, a first port having a first polarity, and a second port having a second polarity. The first polarity is different from the second polarity. The integrated circuit also has a double pole, double throw switch operably coupled between the chains and the ports. The double pole, double throw switch is configured to switch between operation in a first mode and a second mode. In the first mode, the double pole, double throw switch is configured to couple the transmit chain to the first port. In the second mode, however, the double pole, double throw switch is configured to couple the receive chain to second port. As with some other embodiments, the transmit chain is electrically isolated from the receive chain in the first and second modes.

In accordance with still another embodiment of the invention, a beamforming integrated circuit has a single channel with a transmit chain, a receive chain, and a vector modulator. The transmit chain is configured to transmit an output signal, while the receive chain is correspondingly configured to receive an input signal. The integrated circuit also has horizontal and vertically polarity ports. The transmit chain and receive chain are configured to switch between operation in a receive mode and a transmit mode. Moreover, the transmit chain is hardwired to one of the horizontal polarity port and the vertical polarity port, while the receive chain is hardwired to the other of the horizontal polarity port and the vertical polarity port not coupled with the transmit chain. The transmit chain is electrically isolated from the receive chain in the two modes. Further, the transmit chain is inactive when in the receive mode, while the receive chain is inactive when in the transmit mode.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an active electronically steered antenna system has a plurality of lower cost beamforming integrated circuits that each communicate with various antenna elements and have a relatively low transmission loss. To that end, those integrated circuits each have a double pole, double throw switch that selectively connects either one of a transmit or receive chain of the integrated circuit to one of two polarized ports of a single antenna element. Among other things, those antenna element ports may include a horizontal polarity port and a vertical polarity port. Details of illustrative embodiments are discussed below.

Figure 1:
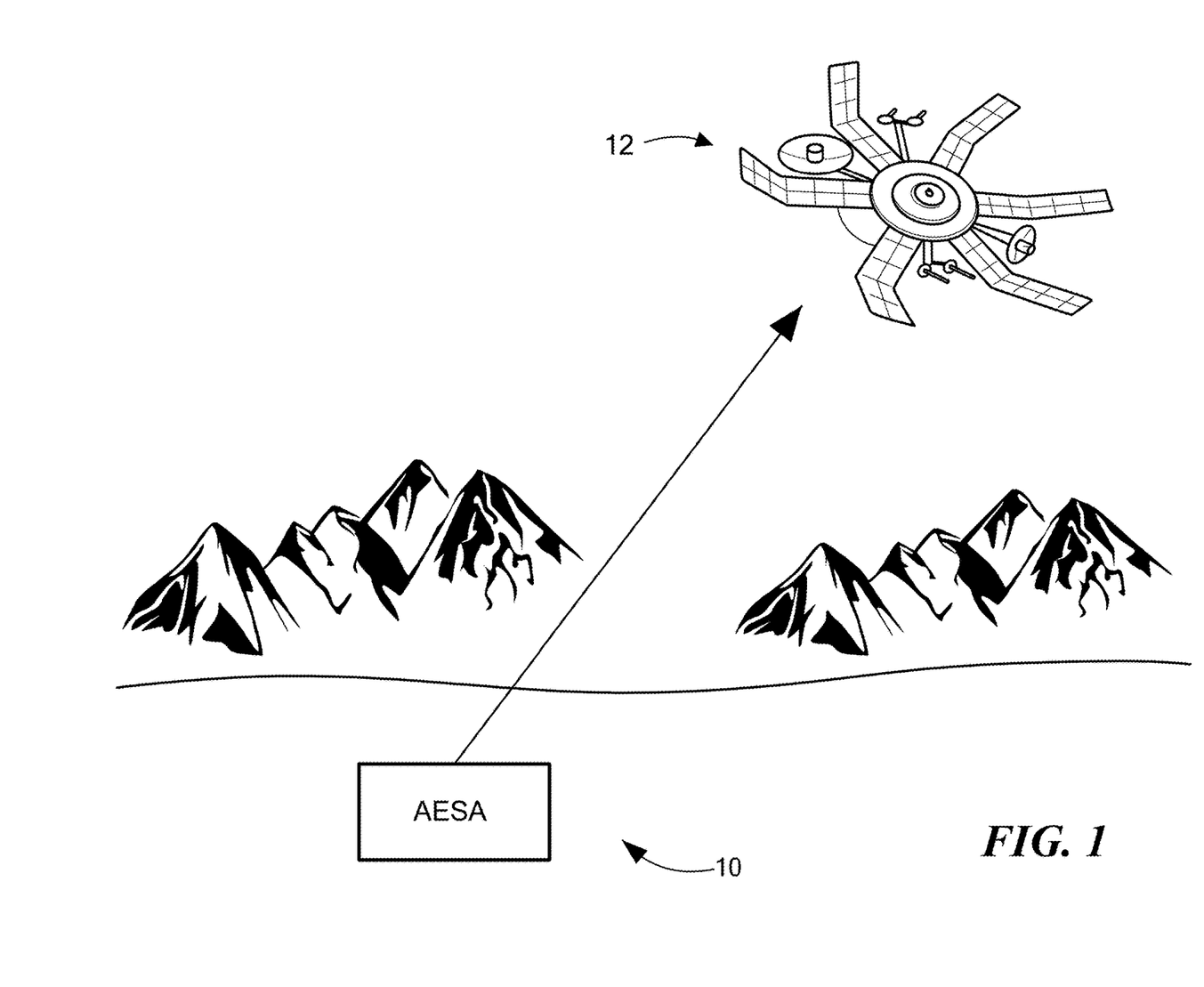
FIG. 1 schematically shows an active electronically steered antenna system ("AESA system") configured in accordance with illustrative embodiments of the invention and communicating with a satellite.

FIG. 1 schematically shows an active electronically steered antenna system ("AESA system 10") configured in accordance with illustrative embodiments of the invention and communicating with an orbiting satellite 12. A phased array (discussed below and identified by reference number "10A") implements the primary functionality of the AESA system 10. Specifically, as known by those skilled in the art, the phased array 10A forms one or more of a plurality of electronically steerable beams that can be used for a wide variety of applications. As a satellite communication system, for example, the AESA system 10 preferably is configured operate at one or more satellite frequencies. Among others, those frequencies may include the Ka-band, Ku-band, and/or X-band.

The satellite communication system may be part of a cellular network operating with a known cellular protocol, such as the 3G, 4G, or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 (implementing the noted phased array 10A) in a wide variety of other applications, such as broadcasting, optics, radar, etc. Some embodiments thus may be configured for non-satellite communications and instead communicate with other devices, such as smartphones (e.g., using 4G or 5G protocols). Accordingly, discussion of communication with orbiting satellites 12 is not intended to limit all embodiments of the invention.

Figure 2A:
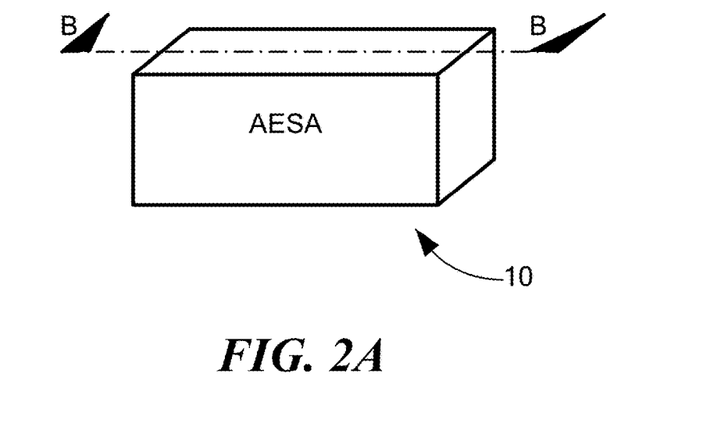
FIGS. 2A and 2B schematically show generalized diagrams of an AESA system that may be configured in accordance with illustrative embodiments of the invention.
Figure 2B:
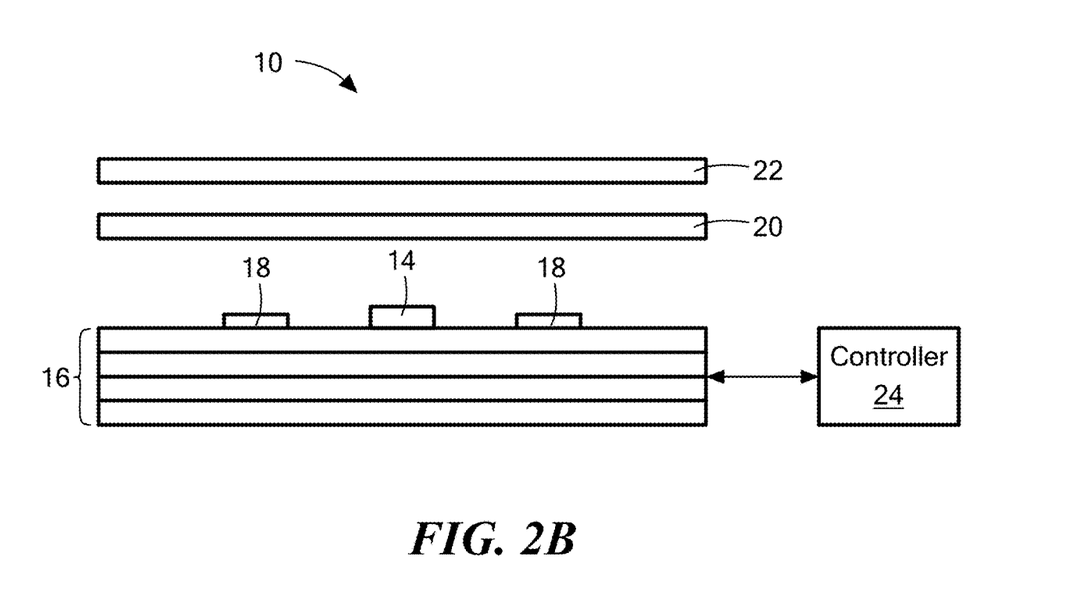

FIGS. 2A and 2B schematically show generalized diagrams of the AESA system 10 configured in accordance with illustrative embodiments of the invention. Specifically, FIG. 2A schematically shows a block diagram of the AESA system 10, while FIG. 2B schematically shows a cross-ssectional view of a small portion of the same AESA system 10 across line B-B. This latter view shows a single silicon integrated circuit 14 (also referred to as a "beam steering IC 14," and controlling elements 18, discussed below) mounted onto a substrate 16 between two transmit and/or receive antenna elements 18, i.e., on the same side of a supporting substrate 16 and juxtaposed with the two elements 18. In alternative embodiments, however, the integrated circuit 14 could be on the other side of the substrate 16. The phased array 10A also has a polarizer 20 to selectively filter signals to and from the phased array 10A, and a radome 22 to environmentally protect the phased array 10A. A separate antenna controller 24 (FIG. 2B) electrically connects with the phased array 10A to calculate beam steering vectors for the overall phased array 10A, and to provide other control functions.

Figure 3A:
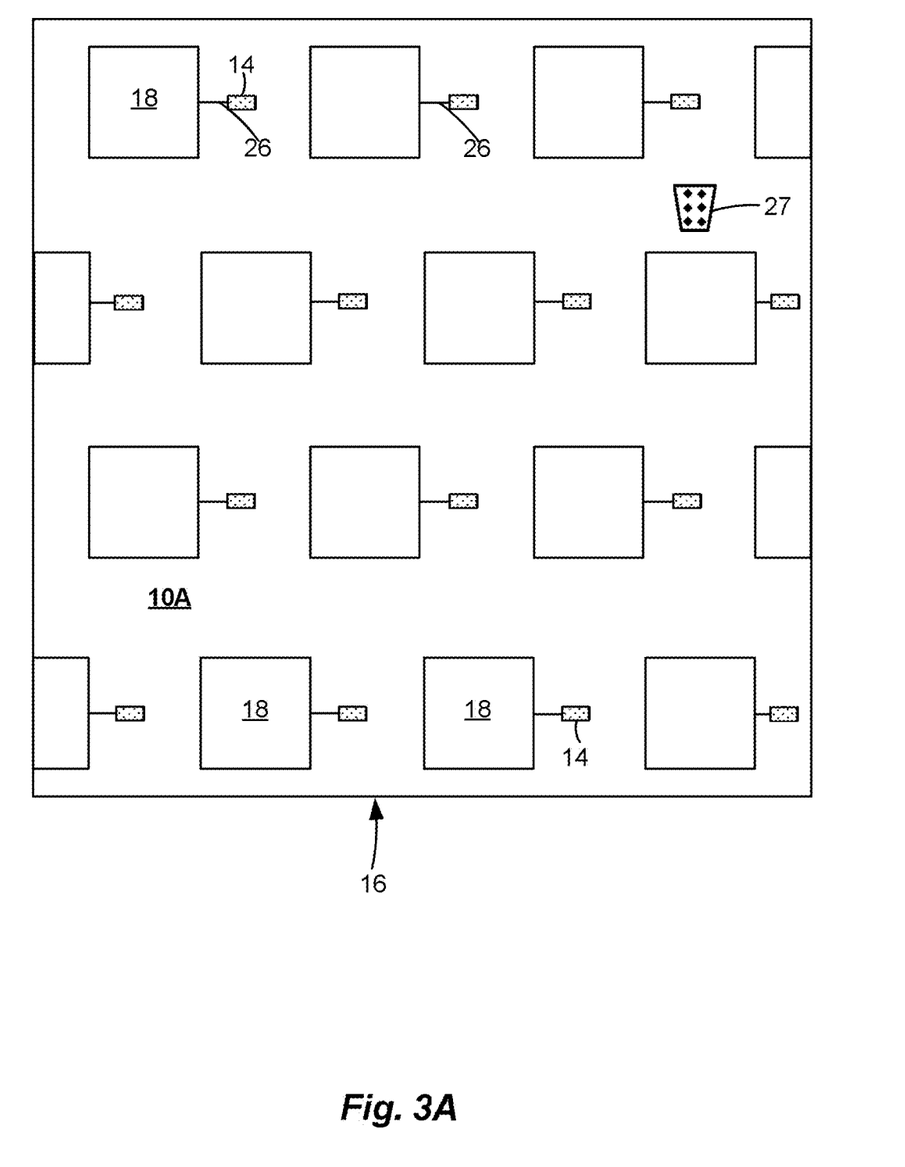
FIG. 3A schematically shows a plan view of a portion of a phased array of an AESA system configured in accordance with illustrative embodiments of the invention.

FIG. 3A schematically shows a plan view of a portion of a phased array 10A that may be configured in accordance with illustrative embodiments of the invention. As shown, the phased array 10A is implemented as a laminar phase array having a laminated printed circuit board 16 (i.e., acting as the substrate 16 and also identified by reference number "16") supporting the above noted plurality of elements 18 and integrated circuits 14. The elements 18 preferably are formed as a plurality of square or rectangular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a rectangular lattice configuration. Like other similar phased arrays, the printed circuit board 16 also may have a ground plane (not shown) that electrically and magnetically cooperates with the elements 18 to facilitate operation.

Indeed, the array shown in FIG. 3A is a portion of a small phased array 10A. Those skilled in the art can apply principles of illustrative embodiments to laminar phased arrays 10A with hundreds, or even thousands of elements 18 and integrated circuits 14. In a similar manner, those skilled in the art can apply various embodiments to smaller phased arrays 10A.

Figure 7:
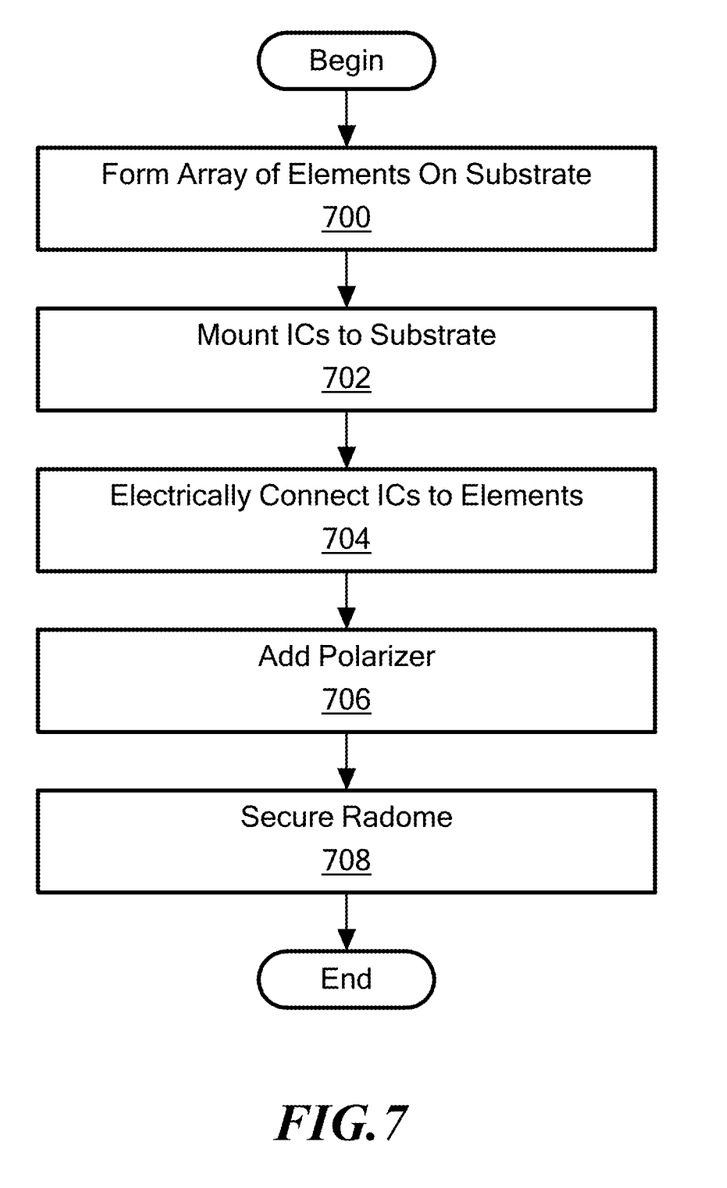
FIG. 7 shows a process of forming an AESA system in accordance with illustrative embodiments of the invention.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. As discussed below with regard to FIG. 7, illustrative embodiments may form the patch antennas using conventional semiconductor fabrication processes, such as by depositing one or more successive metal layers on the printed circuit board 16. Accordingly, using such fabrication processes, each radiating element 18 in the phased array 10A should have a very low profile.

The AESA system 10 can have one or more of any of a variety of different functional types of elements 18. For example, the AESA system 10 can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode (discussed in detail below). The noted controller 24 at least in part controls the mode and operation of the phased array 10A, as well as other array functions.

The AESA system 10 has a plurality of the above noted integrated circuits 14 (noted with regard to FIG. 2B) for controlling operation of the elements 18. As noted above, those skilled in the art often refer to these integrated circuits 14 as "beam steering integrated circuits." Each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
- phase shifting,
- amplitude controlling/beam weighting,
- switching between transmit mode and receive mode,
- output amplification to amplify output signals to the elements 18,
- input amplification for received RF signals (e.g., signals received from the satellite 12), and
- power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier 52, the phase shifting may use conventional active phase shifters, and the switching functionality may be implemented using conventional transistor-based switches. Additional details of the structure and functionality of integrated circuits 14 are discussed below with reference to FIG. 5A.

As noted above, the AESA system 10 preferably communicates with one or more orbiting satellites 12 and thus, uses satellite frequencies for that communication. Accordingly, the plurality of integrated circuits 14 preferably are configured operate the phased array 10A at one or more frequencies of the Ka-band, Ku-band, and/or X-band to communicate with at least one satellite 12. Of course, as satellite communication technology progresses, future implementations may modify the frequency bands of the integrated circuits 14 to communicate using new satellite frequencies.

Figure 3B:
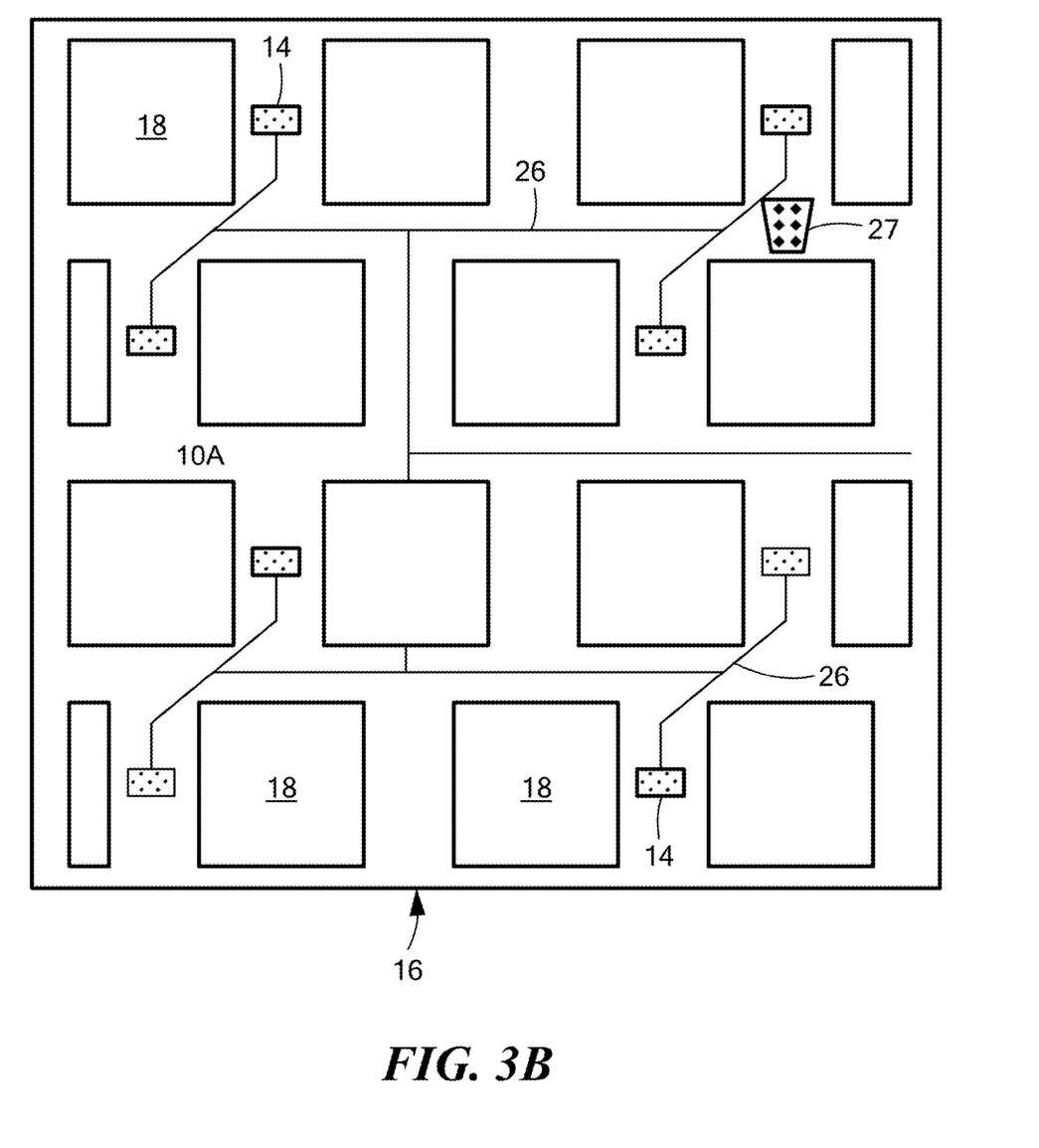
FIG. 3B schematically shows a plan view of a portion of a phased array of an AESA system configured in accordance with alternative embodiments of the invention.

Some embodiments may share integrated circuits 14 between multiple elements 18. For example, as shown in FIG. 3B, each integrated circuit 14 connects with more than one element 18. This solution works well for various embodiments because the number of integrated circuits 14 generally has a direct relation to the size of the printed circuit board 16. This reduced number of integrated circuits 14 correspondingly reduces the required size of the printed circuit board 16, which reduces the cost of the AESA system 10. In addition, more surface area on the top face of the printed circuit board 16 may be dedicated to the elements 18.

Illustrative embodiments, however, do not take advantage of those economies of scale, but still provide improved functionality and results. FIG. 3A is an example of such an embodiment. Specifically, sharing integrated circuits 14 between elements 18 typically requires a relatively long transmission line/beamforming line 26 between the integrated circuit 14 and its elements 18—because the integrated circuit 14 cannot simultaneously be close to all of its elements 18. Undesirably, this long transmission line 26 can create signal loss and interference issues. The inventors recognized, however, that implementing optimal switching and device functionality can minimize the size and cost of the integrated circuits 14. Details of the functional blocks of the integrated circuit 14 implementing such switching and functionality are discussed below, among other places, with regard to FIG. 5A.

Accordingly, as shown in FIG. 3A, each element 18 can have a single corresponding integrated circuit 14. As such, each such element 18 can be positioned very close to its corresponding element 18. Short RF interconnects and/or beam forming lines 26 electrically connect the integrated circuits 14 to their respective elements 18. Although FIG. 3A shows one example, there are other ways to implement that close relationship. For example, the integrated circuit 14 can be positioned on the back side of the substrate 16 and connect to its element 18 using a conductive via or similarly short transmission line 26. This close proximity favorably minimizes signal/feed loss, thus improving array performance.

Each integrated circuit 14 preferably is packaged either in a flip-chipped configuration using wafer level chip scale packaging (WLCSP), or in a traditional package, such as quad flat no-leads package (QFN package). While other types of packaging may suffice, WLCSP techniques are preferred to minimize real estate requirements on the substrate 16. In addition to reducing feed loss, using WLCSP techniques reduces the overall footprint of the integrated circuits 14, also enabling them to be mounted on the top face of the printed circuit board 16 with the elements 18—providing more surface area for the elements 18. The inventors thus discovered that using WLCSP techniques, coupled with other innovations discussed herein, and able the system to operate within acceptable operation specifications. Among other ways, the integrated circuits 14 may be implement packaging techniques of U.S. Patent Application No. 62/412,122, filed Oct. 24, 2015, entitled, "High Performance Packaged Microchip," the disclosure of which is incorporated herein, in its entirety, by reference.

As noted above, the dual-mode elements 18 may operate in a transmit mode, or a receive mode. To that end, the integrated circuits 14 may generate time division diplex or duplex waveforms so that a single aperture or phased array 10A can be used for both transmitting and receiving. A diplexer/duplexer 27 (FIGS. 3A and 3B) may perform this duplexing function.

It should be reiterated that although FIGS. 3A and 3B show the AESA system 10 with some specificity (e.g., the layout of the elements 18 and integrated circuits 14), those skilled in the art may apply illustrative embodiments to other implementations. For example, as noted above, the lattice configuration can be different. Accordingly, discussion of the specific configuration of the AESA system 10 of FIGS. 3A and 3B (and other figures) is for convenience only and not intended to limit all embodiments.

Figure 4:
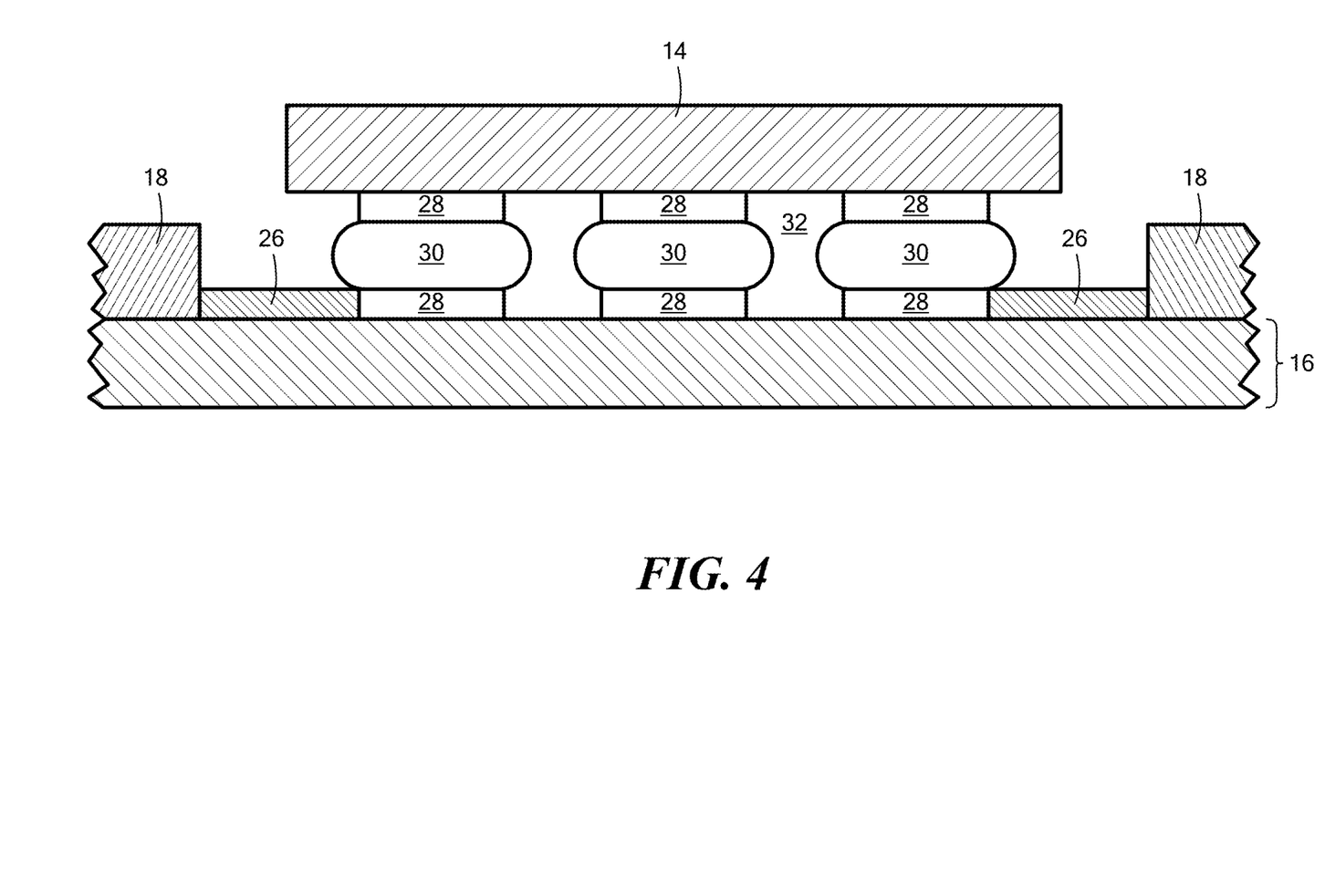
FIG. 4 schematically shows a cross-sectional view of the laminated printed circuit board of 3A to highlight the mounting of its integrated circuits.

FIG. 4 schematically shows a cross-sectional view of the layout of components on the laminated printed circuit board 16 of 3A to highlight the flip-chip mounting of its integrated circuits 14. The integrated circuit 14 in this drawing intentionally is enlarged to show details of a flip-chip mounting technique. Unlike techniques that permit input/output ("I/O") only on the edge of the integrated circuit 14, flip-chip mounting permits I/O on interior portions of the integrated circuit 14.

As shown, the integrated circuit 14 has a plurality of pads 28 aligned with a plurality of corresponding pads 28 on the printed circuit board 16. These opposing pads 28 on the integrated circuit 14 and the printed circuit board 16 may be considered to form pairs of pads 28. Solder 30 (e.g., solder balls) electrically connects each the pads 28 in corresponding pairs of pads 28. Interconnect lines, traces, and other electrical interconnects on/in the printed circuit board 16 (e.g., lines 26) thus permit the integrated circuit 14 to communicate with other elements 18 through this electrical interface.

The embodiment shown in FIG. 4 forms a space or void (identified by reference number "32") between the bottom of the integrated circuit 14 (from the perspective of this drawing) and the top surface of the printed circuit board 16. This space 32 may remain an open void—containing no material. Some embodiments may take advantage of this extra space 32 to add further components, such as additional circuit components, without requiring more circuit board space. Alternatively, this space 32 may contain fill material (not shown) for further stability and thermal management of the integrated circuit 14.

Other embodiments, however, still may use similar integrated circuits 14, but not use flip-chip mounting techniques. Instead, other mounting techniques may couple the integrated circuits 14 with the substrate 16. Among other things, those techniques may incorporate surface mounting, or wirebond mounting with the integrated circuit 14 rotated 180 degrees from the orientation of FIG. 4. Accordingly, discussion of flip chip mounting techniques is but one of a variety of different techniques that may be used with various embodiments of the invention.

Figure 5A:
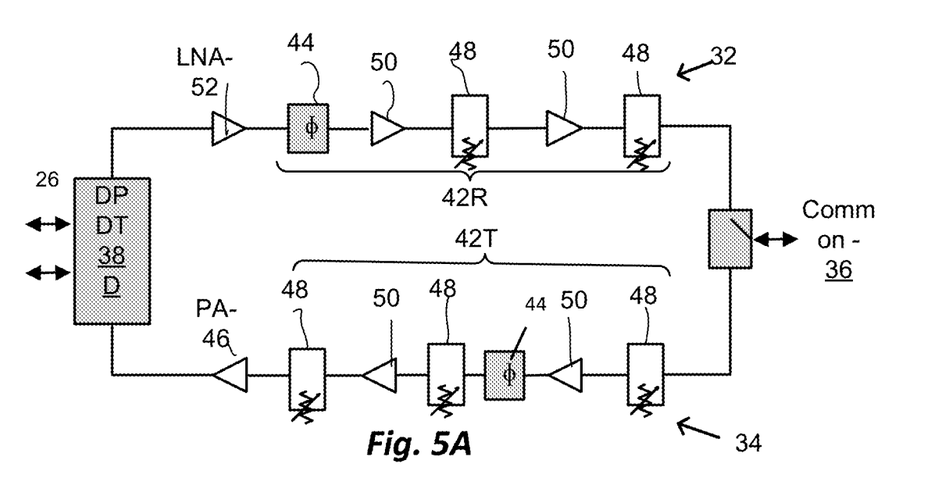
FIG. 5A schematically shows a block diagram of certain portions of a beamforming integrated circuit configured in accordance with illustrative embodiments of the invention.

FIG. 5A schematically shows a block diagram of certain portions of the beamforming integrated circuit 14 in accordance with illustrative embodiments of the invention. As shown, the integrated circuit 14 is considered to form a single channel with two separate signal chains. A first chain, referred to as the "receive chain 32," receives signals from its corresponding element 18, while a second chain, referred to as the "transmit chain 34," transmit signals using the same corresponding element 18. The chains 32 and 34 are connected at one end to a common port 36 of the integrated circuit 14, and at the other end to a specially configured switch 38D that selectively connects each of these chains to one port on the element 18. Details of the switch 38D are discussed below.

Specifically, as noted above, the connected element 18 is considered to have at least two polarized interface ports 40H and 40V (FIG. 5A shows the lines 26 electrically connecting to those ports 40A and 40V). The switch 38D selectively connects the two chains 32 and 34 to these two polarized ports 40H and 40V. In particular, the switch 38D connects one of the chains to one port 40H or 40V in a first mode, and the other of the chains to the other of the ports 40H or 40V in a second mode.

Preferably, those ports 40H and 40V are polarized substantially orthogonal to each other to more effectively manage multiple signal transmission and receipt. To that end, illustrative embodiments implement one port 40H or 40V of the element 18 to receive and/or transmit signals using a horizontal polarization (i.e., port 40H), and the other port 40H or 40V of the element 18 to receive and/or transmit signals using a vertical polarization (i.e., port 40V). On a single element 18, each of these ports 40H and 40V preferably is physically positioned on orthogonal sides of that same single element 18. The single line connections shown in FIGS. 3A and 3B between the integrated circuit 14 and element 18 therefore are simply schematic. Accordingly, the transmission lines 26 on the printed circuit board 16 preferably connect each element port 40H and 40V with one interface on the integrated circuit 14. For example, the integrated circuit 14 may include a pad 28 for coupling with a transmission line to the horizontal port 40H of its element 18, and another pad 28 for connecting with a transmission line to the vertically polarized port 40V of its element 18. The switch 38D selectively connects these pads 28 to the chains 32 and 34 as discussed below.

To accomplish their functions, each of the two chains 32 and 34 of the integrated circuit 14 preferably has a number of functional modules that accomplish functions described above. Specifically, at its core, the transmit chain 34 has a transmit vector modulator 42T for precisely transmitting signals using one of the polarized ports 40H and 40V of its attached element 18. To that end, the transmit vector modulator 42T has a phase shifter 44 (e.g., a four bit, passive digital phase shifter) for modulating the phase of signals to be transmitted. The transmit chain 34 thus has a power amplifier 46 for amplifying the incoming signal received from the transmit vector modulator 42T. In addition, the transmit vector modulator 42T also has three digital step attenuators 48 to control signal amplitude and range, and buffer amplifiers 50 after each digital step attenuator 48 to ensure an acceptable noise figure and signal linearity.

As an example, the combination of the digital step attenuators 48 and phase shifter 44 can control signal amplitude to a prescribed range. For example, the signal amplitude can be controlled over 31 dB of dynamic range at a phase through 360 degrees. The resolution as defined by the number of bits of the functional modules. In preferred embodiments, the digital step attenuators 48 of the transmit chain 34 has a total of six bits, and the resolution is 0.5 dB and 5.625 degrees.

In a corresponding manner, the receive chain 32 has a low noise amplifier 52 to selectively receive incoming signals from one of the polarized ports 40H and 40V of its element 18. The receive chain 32 also has a receive vector modulator 42R to receive an incoming signal from the low noise amplifier 52. Specifically, in a manner similar to the transmit vector modulator 42T, the receive vector modulator 42R has a phase shifter 44 (e.g., a four bit, passive digital phase shifter) for shifting the phase of received signals, and two digital step attenuators 48 to control signal amplitude to a prescribed range. The receive vector modulator 42R similarly also has buffer amplifiers 50 before the digital step attenuators 48 to ensure acceptable noise figure and the signal linearity. Illustrative embodiments optimize the receive vector modulator 42R for the appropriate signal levels and to obtain a favorable noise figure.

Those skilled in the art can use other functional modules to implement the two signal chains 32 and 34 to accomplish similar results. For example, in the implementation discussed above, the low noise amplifier 52 has a fixed gain and thus, the digital step attenuators 48 are programmable to provide optimal ranges. Alternative embodiments, however, may implement the low noise amplifier 52 as a variable gain device, which may eliminate the need for the digital step attenuators 48.

In accordance with illustrative embodiments of the invention, the switch 38D is implemented as a double pole, double throw switch that selectively connects each of the signal chains to one of the element ports 40H or 40V. To that end, the integrated circuit 14 is configured to operate in one of two modes as controlled by the switch 38D. As noted above, those modes may be a transmit mode and a receive mode. When in the transmit mode, the switch 38D connects transmit chain 34 to one of the polarized element ports 40H and 40V. In a corresponding manner, while in this mode, the receive chain 32 is unconnected to the switch 38D—it is dormant. For example, when in the transmit mode, the switch 38D may connect the transmit chain 34 to the vertically polarized port 40V of its element 18. In this example, the receive chain 32 and the horizontally polarized port 40H remain inactive when the integrated circuit 14 is in this mode.

When in the receive mode, however, the switch 38D changes to connect the receive chain 32 to the other of the polarized ports 40H and 40V. In a corresponding manner, while in this mode, the transmit chain 34 is unconnected to the switch 38D—it is dormant. Continuing with the above example, when in the receive mode, the switch 38D may connect the receive chain 32 to the horizontally polarized port 40H of the element 18. For this example, the transmit chain 34 and the vertically polarized port 40V remain inactive during this mode.

Indeed, the above example can be modified so that the transmit chain 34 connects with the horizontally polarized port 40H during the transmit mode, and the receive chain 32 connects with the vertically polarized port 40V during the receiving mode. In either example, only one of the polarized ports 40H or 40V is coupled with only one of the chains 32 or 34 at a given moment.

In both modes, regardless of the position of the switch 38D, the transmit chain 34 is electrically isolated from the receive chain 32. In addition, the switch 38D prevents simultaneous signal receipt by the receive chain 32 and signal transmission by the transmit chain 34.

Use of the double pole double throw switch 38D in this manner avoids the need to use two back to back switches, which can adversely impact performance.

Moreover, some embodiments can selectively "cherry pick" certain functional blocks in either or both signal chains 32 and 34 for a given application—even an application outside of those similar to the above discussed AESA system 10. Specifically, some embodiments may selectively render certain blocks nonfunctional or effectively not functionally impactful to a signal it receives (i.e., effectively deactivating selected circuit blocks). For example, some embodiments may configure the digital step attenuators 48, buffer amplifiers 50, and phase shifter 44 of the transmitting modulator to simply pass a signal through—effectively deactivating those circuit blocks. Thus, in that example, a signal received at the beginning of the vector modulator is substantially the same when it emerges from the end of the vector modulator. To that end, a control device or other apparatus may configure those vector modulator components to have negligible impact, such as by configuring the buffer amplifiers 50 and digital step attenuators 48 to have a unity gain, and setting the phase shifter 44 set to a zero phase shift. Accordingly, the magnitude of a signal received from the common port 36 transmitted through the transmit chain 34 only is amplified by the power amplifier 46, which is activated (i.e., it has a gain that has a net intended impact on the signal).

A similar example may configure the power amplifier 46, buffer amplifiers 50, and digital step attenuators 48 to have a unity gain, while setting the phase shifter 44 to have some positive phase shift. Accordingly, a signal passing through the transmit chain 34 may emerge with the same magnitude but a shifted phase. In either example, some embodiments may modify the gain of the buffer amplifiers 50 to compensate for potential signal degradation or loss through the various components in the chain. Those skilled in the art thus can set this compensation to offset signal loss through the various components, such as through the digital step attenuators 48.

Indeed, similar modifications can be made for the receive chain 32 as well. Accordingly, discussion of modification to the transmit chain 34 to use certain, selected functionality is for simplicity only and not intended to limit all embodiments. In fact, some embodiments may configure the integrated circuit 14 so that one chain has one function and the other chain has another function. For example, the transmit chain 34 may be configured so that it acts purely as a power amplifier 46 without phase shifting, while the receive chain 32 may be configured so that it simply acts the phase shifter 44 without magnitude amplification. Again, as with the other noted embodiments, the various buffer amplifiers 50 may (or may not) be configured to compensate for signal loss through the chains.

In some embodiments, more than one functional block may be selectively engaged in each chain. For example, the receive chain 32 may engage its low noise amplifier 52 and the phase shifter 44 only. As another example, each chain 32 and 34 may have multiple other circuit blocks not shown, such as additional amplifiers and phase shifters 44.

Another example may implement one or both of the chains 32 and/or 34 as a repeater for improving signal fidelity in a passive beam forming network. Similarly, some embodiments may form a flip-chip repeater with isolation enhancement techniques.

Figure 5B:
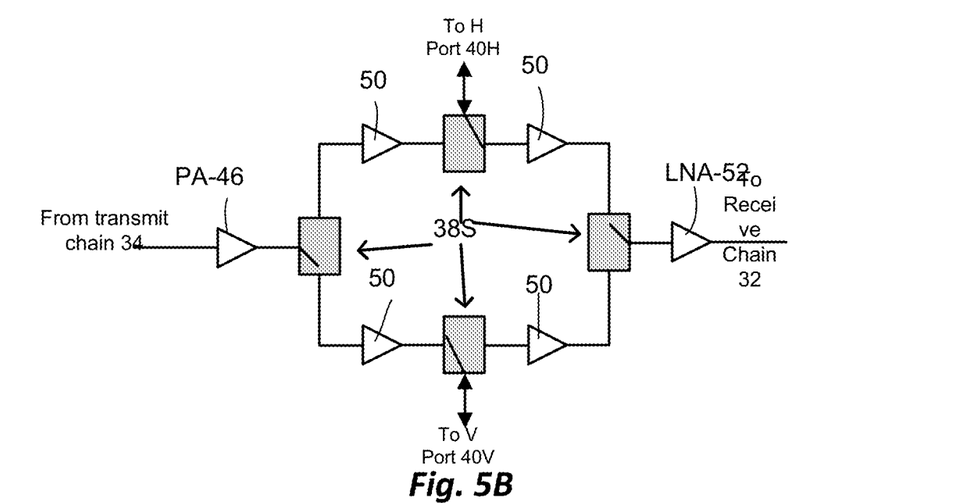
FIG. 5B schematically shows a block diagram of certain portions of a beamforming integrated circuit configured in accordance with alternative embodiments of the invention.

Some embodiments implement the switching arrangement differently than that shown in FIG. 5A. To that end, FIG. 5B schematically shows a block diagram of certain portions of a beamforming integrated circuit 14 configured in accordance with a different switching arrangement. Specifically, this implementation shows the end of the transmit chain 34 on the left side of the drawing, and the beginning of the receive chain 32 on the right side of the drawing. A switching and buffering arrangement between the two chains may selectively connect the two chains 32 and 34 to the element ports 40H and 40V in the two different modes in the same manner as described with regard to FIG. 5A—the receive chain is connected to one element port 40H or 40V in the receive mode, while the transmit chain is connected to the other element port 40H or 40V in the transmit mode. For example, the transmit chain 34 may be connected to the vertically polarized element port 40V in a transmit mode, while the receive chain 32 may be connected to the horizontally polarized element port 40H in the receive mode.

Unlike the switching arrangement of FIG. 5A, which uses a double pole double throw switch, this arrangement uses for four single pole double throw switches 38S to selectively connect the chains 32 and 34 in the desired manner described above. In this embodiment, two buffer amplifiers 50 isolate the transmit chain 34 from the ports 40H and 40V. Also unlike the switching arrangement of FIG. 5A, this embodiment also enables both chains 32 and 34 to be used at the same time. Illustrative embodiments, however, connect no more than one chain 32 or 34 to one element interface 40H or 40V in a given mode. Rather than using buffer amplifiers 50, some embodiments use either the low noise amplifier 52 or power amplifier 46 as required to improve performance of the integrated circuit 14 and the overall system 10.

This multi-switch implementation has a number of benefits. Among other things, it may produce high signal linearity with a low loss. In addition, it provides a separate transmit output stage and a separate receive output stage. In addition, this architecture is compatible with high output power and a low noise figure.

The integrated circuit 14 preferably is formed on a high resistivity silicon substrate (not to be confused with the substrate/printed circuit board 16). Specifically, a high resistivity silicon substrate is expected to have a higher power performance and a lower noise figure. To that end, illustrative embodiments form the integrated circuits 14 using silicon on insulator technology—a silicon-on-insulator wafer.

Figure 6:
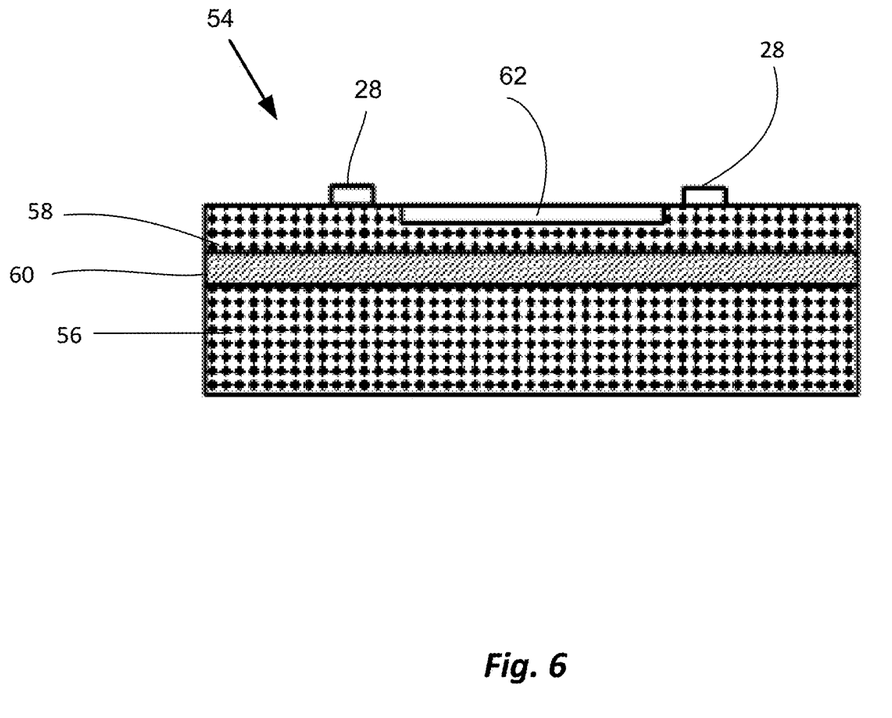
FIG. 6 schematically shows a cross-sectional view of the beamforming integrated circuit of the above figures using silicon-on-insulator technology with circuitry of either of FIGS. 5A and 5B.

To that end, FIG. 6 schematically shows a cross-sectional view of the beamforming integrated circuit 14 of the above figures using silicon-on-insulator technology with circuitry of either of FIGS. 5A and 5B. This view shows the integrated circuit 14 formed on a silicon-on-insulator die 54 ("SOI die 54"). As known by those skilled in the art, the silicon on insulator wafer has a bottom silicon wafer, known as a "handle wafer 56," coupled with a top silicon wafer, known as a "device wafer 58." Although not necessary, the handle wafer 56 typically is much thicker than the device wafer 58. An insulating oxide layer 60 couples together the device and handle wafers 58 and 56. In addition, the insulating oxide layer 60 electrically isolates the handle wafer 56 from the device wafer 58. Accordingly, the device wafer 58 contains the circuitry, such as that shown in FIGS. 5A and 5B and pads 28 for flip chip mounting. FIG. 6 identifies the circuitry by reference number 62.

Although silicon-on-insulator dies 54 may provide desirable results, some embodiments may use other types of silicon wafers, such as partitioned and/or specially doped bulk silicon wafers. For example, some embodiments may form a conductive, highly doped region on the top surface of a die formed from a bulk silicon wafer. This doped region may be electrically isolated from the remainder of the die using oxide lined trenches and other insulative techniques. Accordingly, the highly doped region may be highly conductive, while the remainder of the die may be highly resistive.

FIG. 7 shows a process of forming the phased array 10A/AESA system 10 in accordance with illustrative embodiments of the invention. It should be noted that this process is substantially simplified from a longer process that normally would be used to form the AESA system 10. Accordingly, the process of forming the AESA system 10 may have many other steps, such as testing steps, soldering steps, or passivation steps, which those skilled in the art may use.

In addition, some of the steps may be performed in a different order than that shown, or at the same time. Those skilled in the art therefore can modify the process as appropriate. Moreover, as noted above and below, the discussed materials and structures are merely examples. Those skilled in the art can select the appropriate materials and structures depending upon the application and other constraints. Accordingly, discussion of specific materials and structures is not intended to limit all embodiments.

The process of FIG. 7 begins at step 700, which forms the array of elements 18 on the substrate 16/printed circuit board 16. As noted above, the elements 18 preferably are formed from metal deposited onto the substrate 16 in a triangular lattice. This step also may form pads 28 and transmission lines 26 on the printed circuit board 16 to extend to the elements 18 (from the pads 28). As discussed below, these lines 26 electrically connect the integrated circuits 14 with the elements 18.

In preferred embodiments, the elements 18 are spaced apart from each other as a function of the wavelength of the signals expected to be transmitted and received by the AESA system 10. For example, the distances between the elements 18 may be spaced apart a distance equal to between 40-60 percent of the wavelength of the relevant signals. Some embodiments, however, may vary the spacing of the elements 18. See, for example, co-pending provisional U.S. Patent Application No. 62/376,442, filed on Aug. 18, 2016 and entitled, "Hybrid Laminated Phased Array," for further spacing and other details of similar embodiments. The disclosure of that provisional patent application (U.S. Patent Application No. 62/376,442) is incorporated herein, in its entirety, by reference.

Those skilled in the art can select the appropriate numbers of elements 18, based upon the application. Specifically, a given application may require a specified minimum equivalent isotropically radiated power ("EIRP") for transmitting signals. In addition, that same application may have a specified minimum G/T for receiving signals. Thus, step 700 may form the array to have a minimum number of elements 18 to meet either or both the EIRP and the G/T requirements of the application. For example, after establishing the feed loss and the noise figure of the receive amplifier 40 of the vector receive arms, one in the art can set the array size to a desired G/T. Of course, the phased array 10A may have more elements 18 beyond that minimum number.

Other embodiments may use other requirements for selecting the appropriate number of elements 18. Accordingly, discussion of the specific means for selecting the appropriate number of elements 18, and their spacing, is for descriptive purposes only and not intended to limit various embodiments of the invention.

At step 702, the process mounts the integrated circuits 14 to the printed circuit board 16/substrate 16. To that end, as noted above, when using WLCSP integrated circuits 14, illustrative embodiments may use conventional flip-chip mounting processes. Such a process directly electrically connects the integrated circuits 14 to the elements 18 (step 704). To that end, such embodiments may deposit solder paste (e.g., powdered solder and flux) on the pads 28 of the printed circuit board 16, and position the integrated circuits 14 on their respective board pads 28. Then, the printed circuit board 16 may be heated (e.g., using a reflow oven or process) to physically and electrically couple the pads 28 with the solder 30.

Some embodiments that do not use flip-chip mounted WLCSP integrated circuits 14, however, may require the additional step of step 704 to electrically connect the integrated circuits 14 to the elements 18. For example, a wirebond operation may be required to solder wirebonds between the integrated circuits 14 and the elements 18.

The process concludes by adding the polarizer 20 (step 706) and securing the radome 22 (step 708) to the apparatus in a conventional manner.

Accordingly, various embodiments optimize the switching arrangement of the integrated circuit 14 to improve performance and reduce overall array cost. Using the double pole, double throw switch implementation optimizes isolation and permits single channel integrated circuits 14 to be positioned very close to their assigned element 18. Moreover, some embodiments enable the effective use of a silicon substrate in an AESA application, and/or provide the flexibility to use selected functions of the integrated circuit 14 in a wide variety of other applications.

Figure 8:
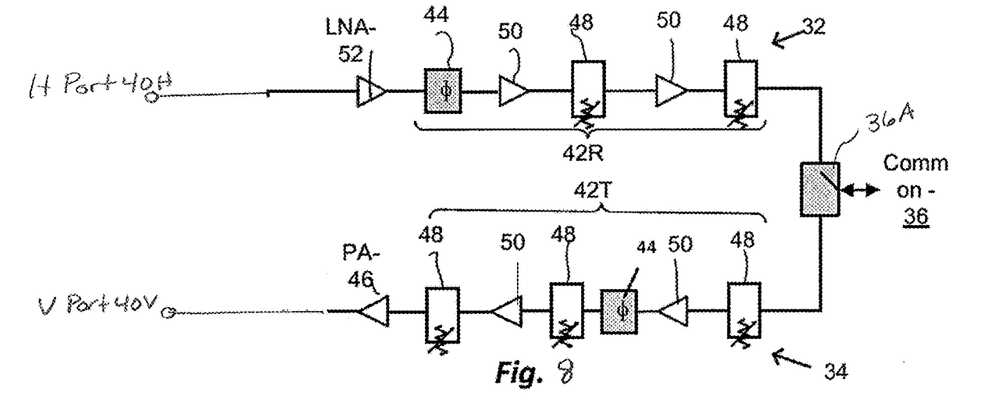
FIG. 8 schematically shows a block diagram of certain portions of a beamforming integrated circuit configured in accordance with alternative embodiments of the invention.

FIG. 8 schematically shows a block diagram of certain portions of a beamforming integrated circuit configured in accordance with alternative embodiments of the invention. Specifically, this embodiment omits the switch 38D of FIG. 5A and hardwires the horizontally polarized 40H to one chain 32 or 34, and similarly hardwires the vertically polarized port 40V to the other of the chains 32 or 34. In this example, the receive chain 32 is hardwired via a metal or other conductive coupling to the horizontally polarized 40H, while the transmit chain 34 is hardwired via a metal or other conductive coupling to the vertically polarized port 40V. As such, there is no switching between the two ports 40H and 40V. Of course, the circuit of FIG. 8 is an example and thus, the receive chain 32 may be hardwired to the vertically polarized 40V and the transmit chain 34 may be hardwired to the horizontally polarized 40H.

Accordingly, other than removing the switch 38D and using a hardwired connections instead, this embodiment should operate in a manner similar to that discussed above with other embodiments, such as that of FIG. 5A. Thus, for example, the two chains 32 and 34 are electrically isolated in transmit and receive modes, and the receive chain 32 is inactive when in the transmit mode, while the transmit chain 34 is inactive when in the receive mode. Among other ways, this programmable embodiment is useful for static applications, and lowers losses through the switch 38.

To ensure this performance, in a manner similar to the other embodiments, this embodiment also has the common switch (identified in FIG. 8 by reference number 36A) at the opposite end of the chains 32 and 34, which enables/disables the chains. In addition, various embodiments also may have an enable port/pin that couples with circuitry so that when it receives a certain signal, it forces transmit or receive operation.

Although the above discussion discloses various exemplary embodiments of the invention, it should be apparent that those skilled in the art can make various modifications that will achieve some of the advantages of the invention without departing from the true scope of the invention.

What is claimed is:

1. A beamforming integrated circuit comprising:
   a single channel having a transmit chain, a receive chain, and a vector modulator, the transmit chain configured to transmit an output signal, the receive chain configured to receive an input signal;
   a horizontal polarity port; and
   a vertical polarity port;
   the transmit chain and receive chain being configured to switch between operation in a receive mode and a transmit mode,
   the transmit chain being hardwired to one of the horizontal polarity port and the vertical polarity port,
   the receive chain being hardwired to the other of the horizontal polarity port and the vertical polarity port not coupled with the transmit chain,
   the transmit chain configured to be electrically isolated from the receive chain in the receive and transmit modes,
   the transmit chain configured to be inactive in the receive mode, the receive chain configured to be inactive in the transmit mode.

2. The beamforming integrated circuit as defined by claim 1 wherein the vector modulator is configured to either or both modulate an output signal or modulate an input signal.

3. The beamforming integrated circuit as defined by claim 1 wherein the vertical polarity is substantially orthogonal to the horizontal polarity.

* * * * *